US012167256B2

(12) United States Patent
Bertolina

(10) Patent No.: US 12,167,256 B2
(45) Date of Patent: Dec. 10, 2024

(54) LOW ENERGY INDUSTRIAL WIRELESS INSTRUMENTS NETWORK

(71) Applicant: Schneider Electric Systems USA, Inc., Foxborough, MA (US)

(72) Inventor: Mark V. Bertolina, Milton, MA (US)

(73) Assignee: Schneider Electric Systems USA, Inc., Foxborough, MA (US)

(*) Notice: Subject to any disclaimer, the term of this patent is extended or adjusted under 35 U.S.C. 154(b) by 800 days.

(21) Appl. No.: 17/259,826

(22) PCT Filed: Jul. 19, 2019

(86) PCT No.: PCT/US2019/042677
§ 371 (c)(1),
(2) Date: Jan. 12, 2021

(87) PCT Pub. No.: WO2020/018953
PCT Pub. Date: Jan. 23, 2020

(65) Prior Publication Data
US 2021/0274364 A1 Sep. 2, 2021

Related U.S. Application Data

(60) Provisional application No. 62/701,336, filed on Jul. 20, 2018.

(51) Int. Cl.
*H04W 24/02* (2009.01)
*H04W 4/80* (2018.01)
(Continued)

(52) U.S. Cl.
CPC ............. *H04W 24/02* (2013.01); *H04W 4/80* (2018.02); *H04W 28/0875* (2020.05); *H04W 84/18* (2013.01)

(58) Field of Classification Search
CPC ......... H04L 67/56; H04L 45/22; H04L 67/12; H04W 24/02; H04W 40/00;
(Continued)

(56) References Cited

U.S. PATENT DOCUMENTS

2010/0150072 A1* 6/2010 Ishii ...................... H04L 45/122
370/328
2012/0051211 A1 3/2012 Budampati et al.
(Continued)

FOREIGN PATENT DOCUMENTS

| CN | 103841621 A | 6/2014 |
|---|---|---|
| CN | 104010314 A | 8/2014 |

(Continued)

OTHER PUBLICATIONS

Indian Examination Report for Indian Patent Application No. 202117000334 dated Oct. 25, 2022.
(Continued)

*Primary Examiner* — Oussama Roudani
(74) *Attorney, Agent, or Firm* — Locke Lord LLP

(57) ABSTRACT

An industrial wireless instruments network connects a plurality of industrial wireless instruments to a monitoring and control application. The network employs wireless relay nodes that operate as dedicated proxies for the wireless instruments to which they are connected in the network. In some embodiments, the wireless relay nodes are Bluetooth Low Energy (BLE) devices that are capable of implementing Bluetooth version 4.0 or higher. In some embodiments, the relay nodes are deployed in a multi-hop arrangement to extend the range between the wireless instruments and the monitoring and control application. In some embodiments, the relay nodes are deployed in parallel so as to provide easy
(Continued)

scale out, redundancy, and load-balancing. Such an arrangement has several advantages over conventional solutions like mesh networks.

21 Claims, 6 Drawing Sheets

(51) Int. Cl.
*H04W 28/08* (2023.01)
*H04W 84/18* (2009.01)

(58) Field of Classification Search
CPC ... H04W 28/0875; H04W 4/80; H04W 84/18; Y02D 30/70
See application file for complete search history.

(56) References Cited

U.S. PATENT DOCUMENTS

| | | | | |
|---|---|---|---|---|
| 2015/0156070 A1* | 6/2015 | Gidlund | ............... | H04L 45/26 370/254 |
| 2016/0088424 A1* | 3/2016 | Polo | ............... | H04W 88/04 455/41.1 |
| 2016/0337875 A1* | 11/2016 | Sheng | ............... | H04W 4/70 |
| 2016/0366634 A1* | 12/2016 | Khalife | ............... | H04W 8/005 |
| 2017/0264532 A1* | 9/2017 | Guo | ............... | H04W 40/04 |
| 2017/0264629 A1 | 9/2017 | Wei et al. | | |
| 2018/0139680 A1* | 5/2018 | Hui | ............... | H04W 40/16 |
| 2018/0157838 A1 | 6/2018 | Bushey et al. | | |
| 2019/0364407 A1* | 11/2019 | Kaseva | ............... | H04W 4/80 |

FOREIGN PATENT DOCUMENTS

| | | |
|---|---|---|
| WO | 2017140950 A1 | 8/2017 |
| WO | 2017222449 A1 | 12/2017 |

OTHER PUBLICATIONS

Communication Pursuant to Article 94(3) EPC dated Feb. 2, 2023.
Indian Examination Report dated Nov. 24, 2022.
International Search Report and Written Opinion for Application No. PCT/US2019/042677 dated Sep. 20, 2019.

* cited by examiner

LOW ENERGY INDUSTRIAL WIRELESS INSTRUMENTS NETWORK

CROSS-REFERENCE TO RELATED APPLICATIONS

This application claims the benefit of priority to U.S. Provisional Patent Application No. 62/701,336, entitled "End Node and Bluetooth Low Energy System," filed on Jul. 20, 2018, the disclosure of which is hereby incorporated by reference.

TECHNICAL FIELD

The present disclosure relates to industrial wireless instruments and, more particularly, to methods and systems for implementing a low energy industrial wireless instruments network.

BACKGROUND

Industrial wireless instruments, such as sensors, actuators, controllers and various other industrial devices, are being increasingly used in place of their wired counterparts. Such industrial wireless instruments offer several benefits. For one thing, industrial wireless instruments do not require cables to be run throughout a facility, thus providing a substantial savings in installation costs. These devices also provide flexibility in that they may be easily installed at any number of locations in the facility and easily relocated to any number of locations in the facility.

Each industrial wireless instrument is typically connected as a node in a wireless network that covers all or portions of the facility. The wireless network establishes routing paths between the nodes and a monitoring and control application. The monitoring and control application may then obtain measurements and readings from the nodes and issue commands and instructions to the nodes as needed and/or on a regularly scheduled basis. The monitoring and control application can also store the measurements and readings in a database and otherwise make them available to other applications and users.

While a number of advances have been made in the field of industrial wireless instruments network, it will be readily appreciated that improvements are continually needed.

SUMMARY

The present disclosure provides an industrial wireless instruments network. The network employs wireless relay nodes that operate as dedicated proxies for the wireless instruments to which they are connected in the network. In some embodiments, the relay nodes are deployed in a multi-hop arrangement to extend the range between the wireless instruments and the monitoring and control application. In some embodiments, the relay nodes are deployed in a parallel arrangement so as to provide easy scale out, redundancy, and load-balancing.

In general, in one aspect, embodiments of the present disclosure relate to a method of forming an industrial wireless instruments network. The method comprises, among other things, providing at least one routing path in the network using a low energy wireless multi-hop mesh protocol, each of the at least one routing path being a specific, predefined connection-oriented routing path in the network, and connecting one of at least one industrial wireless instrument to one of at least one network gateway using the at least one routing path. The method further comprises relaying data from the one of at least one industrial wireless instrument to the one of at least one network gateway through at least one relay node in the at least one routing path, the at least one relay node relaying the data between a specific, predefined sending node and a specific, predefined receiving node in the at least one routing path using a proxy protocol.

In one or more embodiments, the sending node is one of an industrial wireless instrument or a specific, predefined relay node, and the receiving node is one of a specific, predefined relay node or a network gateway.

In one or more embodiments, the at least one routing path includes a multi-hop routing path connecting the one of at least one industrial wireless instrument to the one of at least one network gateway, the multi-hop routing path including a plurality of relay nodes, each relay node constituting one hop in the multi-hop routing path. In one or more embodiments, the at least one routing path includes an active routing path connecting the one of at least one industrial wireless instrument to the one of at least one network gateway, and each of the at least one relay node in the at least one routing path is dedicated to a specific, predefined sending node and a specific, predefined receiving node in the at least one routing path. In one or more embodiments, the at least one routing path includes a parallel routing path connecting the one of at least one industrial wireless instrument to the one of at least one network gateway, and each of the at least one relay node in the parallel routing path is a parallel relay node. In one or more embodiments, the at least one routing path includes a redundant routing path connecting the one of at least one industrial wireless instrument to the one of at least one network gateway, and each of the at least one relay node in the redundant routing path is a redundant relay node. In one or more embodiments, the at least one routing path includes a redundant, parallel, multi-hop routing path connecting the one of at least one industrial wireless instrument to the one of at least one network gateway, and each of the at least one relay node in the redundant, parallel, multi-hop routing path is a redundant, parallel relay node.

In one or more embodiments, the low energy wireless multi-hop mesh protocol is Bluetooth Low Energy. In one or more embodiments, the at least one relay node includes industrial wireless instrument functionality.

In general, in another aspect, embodiments of the present disclosure relate to an industrial wireless instruments network. The network comprises, among other things, at least one industrial wireless instrument, and at least one relay node operable to provide at least a portion of a routing path between the at least one industrial wireless instrument and a network gateway. The at least one relay node is operable to relay data between a specific, predefined sending node and a specific, predefined receiving node in the routing path using a proxy protocol, and the routing path is a specific, predefined connection-oriented routing path that uses a low energy wireless multi-hop mesh protocol.

In one or more embodiments, the sending node is one of an industrial wireless instrument or a specific, predefined relay node, and the receiving node is one of a specific, predefined relay node or the network gateway.

In one or more embodiments, the routing path is a multi-hop routing path connecting the at least one industrial wireless instrument to the network gateway, the multi-hop routing path including a plurality of relay nodes, each relay node constituting one hop in the multi-hop routing path. In one or more embodiments, the routing path is an active routing path connecting the at least one industrial wireless instrument to the network gateway, and each of the at least one relay node in the active routing path is dedicated to a specific, predefined sending node and a specific, predefined receiving node in the routing path. In one or more embodiments, the routing path is a parallel routing path connecting the at least one industrial wireless instrument to the network gateway, and each of the at least one relay node in the parallel routing path is a parallel relay node. In one or more embodiments, the routing path is a redundant routing path connecting the at least one industrial wireless instrument to the network gateway, and each of the at least one relay node in the redundant routing path is a redundant relay node. In one or more embodiments, the at least one routing path includes a redundant, parallel, multi-hop routing path connecting the at least one industrial wireless instrument to the network gateway, and each of the at least one relay node in the redundant, parallel, multi-hop routing path is redundant, parallel relay node.

In one or more embodiments, the low energy wireless multi-hop mesh protocol is Bluetooth Low Energy. In one or more embodiments, the at least one relay node includes industrial wireless instrument functionality.

In general, in yet another aspect, embodiments of the present disclosure relate to a relay node for an industrial wireless instruments network. The relay node comprises, among other things, a wireless communication interface, a processing system in communication with the wireless communication interface, and a storage system connected to the processing system. The storage system stores program instructions that, when executed by the processing system, cause the relay node to perform operations comprising providing a portion of at least one routing path in the network using a low energy wireless multi-hop mesh protocol, each of the at least one routing path being a specific, predefined connection-oriented routing path in the network. The program instructions further cause the relay node to perform operations comprising connecting at least one industrial wireless instrument to a network gateway using the portion of the at least one routing path, and relaying data from the at least one industrial wireless instrument to the network gateway, the relay node relaying the data between a specific, predefined sending node and a specific, predefined receiving node in the portion of the at least one routing path using a proxy protocol.

In one or more embodiments, the sending node is one of an industrial wireless instrument or a specific, predefined relay node, and the receiving node is one of a specific, predefined relay node or the network gateway.

In one or more embodiments, the routing path is a multi-hop routing path connecting the at least one industrial wireless instrument to the network gateway, the multi-hop routing path including a plurality of relay nodes, each relay node constituting one hop in the multi-hop routing path. In one or more embodiments, the routing path is an active routing path connecting the at least one industrial wireless instrument to the network gateway, and the relay node is dedicated to a specific, predefined sending node and a specific, predefined receiving node in the routing path. In one or more embodiments, the routing path is a parallel routing path connecting the at least one industrial wireless instrument to the network gateway, and the relay node is a parallel relay node in the parallel routing path. In one or more embodiments, the routing path is a redundant routing path connecting the at least one industrial wireless instrument to the network gateway, and the relay node is a redundant relay node in the redundant routing path. In one or more embodiments, the at least one routing path includes a redundant, parallel, multi-hop routing path connecting the at least one industrial wireless instrument to the network gateway, and the relay node is redundant, parallel relay node in the redundant, parallel, multi-hop routing path.

In one or more embodiments, the low energy wireless multi-hop mesh protocol is Bluetooth Low Energy. In one or more embodiments, the relay node includes industrial wireless instrument functionality.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

This description and the accompanying drawings illustrate exemplary embodiments of the present disclosure and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

It is noted that, as used in this specification and the appended claims, the singular forms "a," "an," and "the," and any singular use of any word, include plural referents unless expressly and unequivocally limited to one referent. As used herein, the term "includes" and its grammatical variants are intended to be non-limiting, such that recitation of items in a list is not to the exclusion of other like items that can be substituted or added to the listed items.

At a high level, embodiments of the present disclosure provide systems and methods for implementing an industrial wireless instruments network that connects a plurality of industrial wireless instruments to a monitoring and control application. The systems and methods employ wireless relay nodes that operate as dedicated proxies for the industrial wireless instruments to which they are connected in the network. In some embodiments, the wireless relay nodes are low energy wireless devices that implement a low energy wireless multi-hop protocol. Any suitable low energy wireless multi-hop protocol may be used, such as Bluetooth Low Energy (BLE) version 4.0 or higher. In some embodiments, the systems and methods deploy the relay nodes in a multi-hop arrangement to extend the range between the industrial wireless instruments and the monitoring and control application. In some embodiments, the systems and methods deploy the relay nodes in parallel so as to provide easy scale out, redundancy, and load-balancing. These embodiments, and other embodiments described herein, offer numerous advantages over conventional solutions like mesh networks, where issues often arise related to network settling time (for every change to the mesh), throughput predictability (or lack thereof), scalability, redundancy, and complexity.

Figure 1:
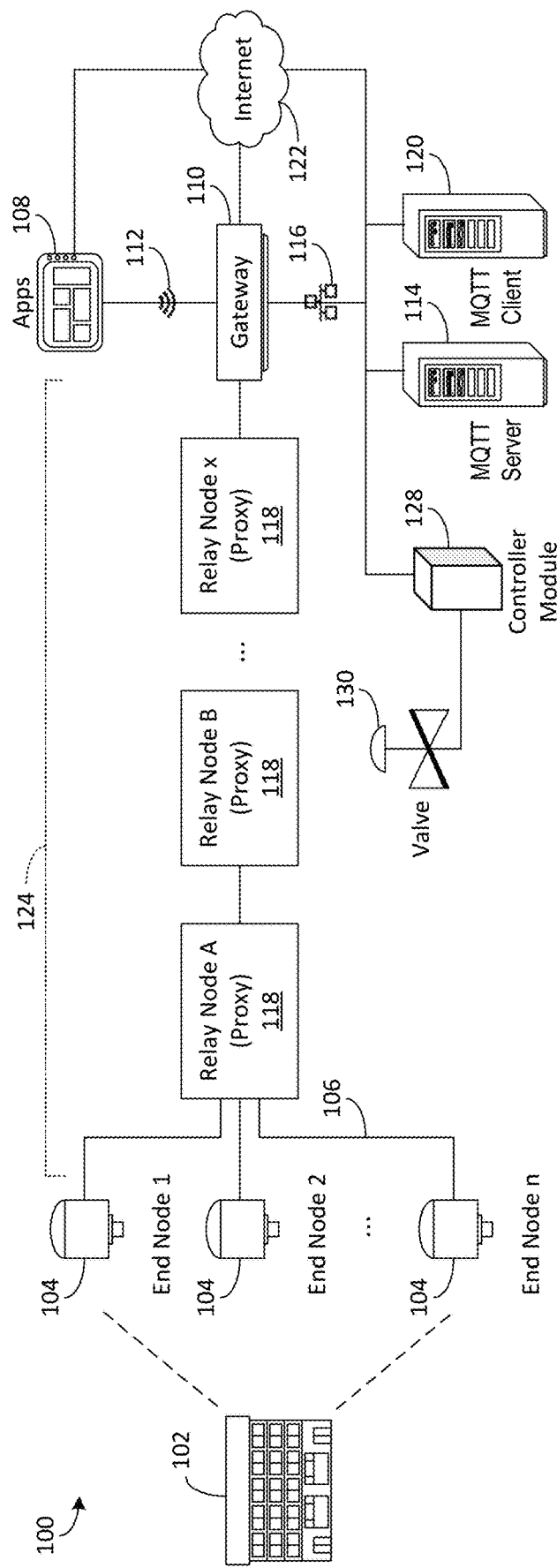
FIG. 1 is a schematic diagram illustrating an exemplary industrial wireless instruments network employing relay nodes in a multi-hop routing path according to embodiments of the present disclosure.

Referring now to FIG. 1, an exemplary industrial wireless instruments network 100 is shown according to some embodiments of the present disclosure. In the example of FIG. 1, the network 100 is implemented for an industrial facility 102, such as a chemical processing facility, a manufacturing facility, a warehouse facility, and the like. These industrial facilities 102 typically occupy a large area or space and would benefit greatly from the use of an industrial wireless instruments network to monitor and control their operations. Conventional mesh networks, however, tend to consume a lot of power by simultaneously maintaining multiple open, active pathways through which data from a given wireless instrument can be routed. In contrast, as explained herein, the network 100 can employ a mesh protocol to maintain a specific, predefined active routing path (i.e., a non-mesh routing path) for a given wireless instrument, thereby significantly reducing network power consumption. It is of course possible to use the network 100 in a non-industrial facility, such as an office building, a residential complex, a retail establishment, and the like.

The network 100 may include multiple industrial wireless instruments 104. The industrial wireless instruments 104 may be any wireless instrument that is capable of transmitting and receiving data and/or commands using a low energy wireless connection, indicated at 106. More specifically, the industrial wireless instruments 104 may be any device that includes a low energy wireless multi-hop protocol stack, either as a discrete function or integrated with other functionality. Examples of industrial wireless instruments 104 that may be used include various sensors, such as temperature sensors, pressure sensors, humidity sensors, light sensors, level sensors, particle sensors, and proximity sensors, as well as various controllers that actuate or control actuation of other devices, including sensors, valves, switches, and the like. These wireless instruments 104 are designated as "end nodes" (e.g., End Node 1, End Node 2, through End Node n) in the network 100 for ease of reference to indicate that they affect or have an effect on some operational aspect of the facility 102, as distinguished from other nodes in the network 100 that function primarily to facilitate communication over the network 100.

In operation, the wireless instruments 104 acquire various measurements and readings relating to some operational aspect of the facility 102 and/or carry out various commands relating to some operational aspect of the facility 102. Thereafter, the wireless instruments 104 transmit their measurements, readings, statuses, and the like over the network 100 to one or more monitoring and control applications 108 and/or receive commands therefrom over the network 100. The one or more monitoring and control applications 108 may be conventional computer applications (e.g., a laptop application), mobile applications (e.g., a smart phone/tablet application), or a more computationally intensive application requiring a larger amount of computing capacity. Examples of suitable monitoring and control applications include the EcoStruxure™ series of scalable supervisory control and data acquisition (SCADA) applications available from Schneider Electric USA, Inc., of Boston, Massachusetts.

A gateway 110 may be provided as a network interface to allow the one or more monitoring and control applications 108 to communicate with the wireless instruments 104, for example, over a Wi-Fi connection 112. Any suitable network interface device may be used as the gateway 110 so long as the device can translate between the low energy wireless multi-hop protocol used by the wireless instruments 104 and other standard networking protocol. Thus, in addition to the one or more monitoring and control applications 108, the gateway 110 can also allow a database server 114, when present, to receive and store the various measurements and readings from the wireless instruments 104, for example, over an Ethernet connection 116. The database server 114 may be any suitable database server, such as an MQTT (Message Queuing Telemetry Transport) server or other server implementing a publish/subscribe messaging protocol. A client server 120, when present, may also be connected to the gateway 110 over the Ethernet connection 116 as well as over the Internet 122 in some embodiments. In some embodiments, the sensors mentioned above can provide process measurement values that are communicated via the gateway 110 to a controller module 128. The measurements values are then compared by control functions in the controller module 128 against process setpoints defined by plant operations. These control functions can thereafter calculate appropriate changes to one or more valves 130 as needed to meet plant objectives.

In accordance with the disclosed embodiments, a plurality of relay nodes 118 may be deployed as part of the industrial wireless instruments network 100 to provide a routing path or channel, indicated generally at 124, between the gateway 110 and the industrial wireless instruments 104. Like the wireless instruments 104, each relay node 118 is capable of transmitting and receiving over a low energy wireless connection (i.e., each relay node 118 includes a low energy wireless multi-hop protocol stack). However, the relay nodes 118 have been configured to form a specific, pre-defined connection-oriented routing path 124 through the network 100 instead of an ad-hoc routing path, as typically found in conventional mesh networks. The term "connection-oriented" as used herein means the nodes forming the routing path must first establish a connection with one another before exchanging data. To this end, each relay node 118 in the network 100 is configured to be connected between two other specific, predefined relay nodes 118, or between a wireless instrument 104 and a specific, predefined relay node 118, or between a specific, predefined relay node 118 and the gateway 110.

In the example of FIG. 1, the various relay nodes 118 are designated as Relay Node A, Relay Node B, through Relay Node x. Each of the wireless instruments 104 is configured to establish a connection with the first relay node 118 in the routing path 124, Relay Node A, as will be described further below. Relay Node A in turn is configured to be connected to Relay Node B, which is in turn configured to be connected to Relay Node C (not expressly shown), and so on, with the last relay node 118 in the routing path 124 being configured to connect to the gateway 110, as will also be described further below. Each connection forms one "hop" in the routing path 124, such that there may be multiple hops between the wireless instruments 104 and the gateway 110. Additional relay nodes 118 may be added as needed to form a longer multi-hop routing path 124 that extends an effective range of the wireless instruments 104.

Each relay node 118 operates as a proxy (i.e., an intermediary) that is dedicated to the two nodes to which each relay node 118 is connected in whichever routing path is currently active (e.g., routing path 124). In the FIG. 1 example, Relay Node A operates as a proxy between one of the wireless instruments 104 (e.g., End Node 1) and Relay Node B, which in turn operates as a proxy between Relay Node A and Relay Node C (not expressly shown), and so on. When End Node 1 sends data to the gateway 110, the data passes through Relay Node A, then Relay Node B, and so on along the routing path 124. The same routing path 124 is followed in reverse when the gateway 110 sends data to the End Node 1. This is the case even when alternative routing paths are available in the network 100 other than the routing path 124, according to embodiments of the present disclosure.

Figure 2:
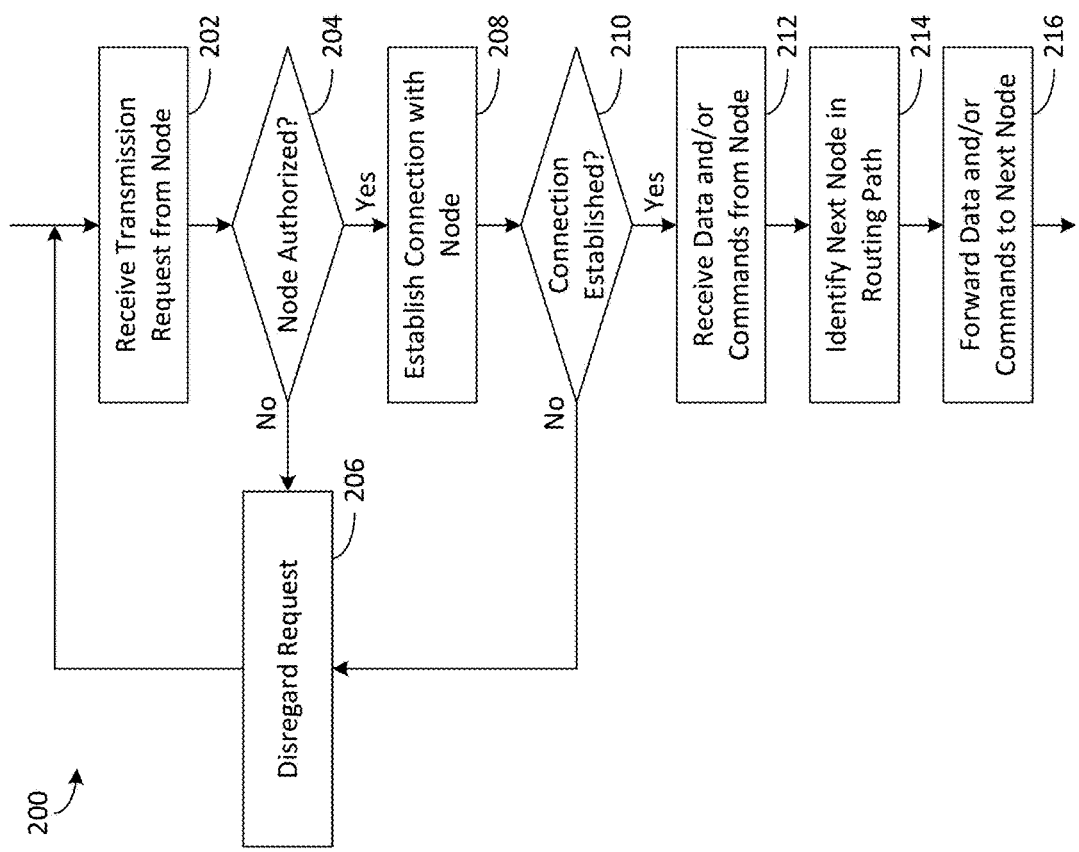
FIG. 2 is a flow diagram illustrating an exemplary method that may be used with a relay node from FIG. 1 according to embodiments of the present disclosure.

Operation of the various relay nodes 118 may be generally explained with respect to FIG. 2, which shows a flow diagram 200 illustrating an exemplary method that may be used with the relay nodes 118. The flow diagram 200 generally begins at block 202 when a relay node (e.g., Relay Node A) receives a transmission request from another node, such as one of the end nodes (i.e., End Nodes 1–n) or another relay node (e.g., Relay Node B). At block 204, the relay node determines whether the requesting node is one with which the relay node is authorized to establish a connection, for example, by referring to an authorized connections list. If the determination is no, then the relay node disregards the transmission request at block 206 and returns to block 202 to await further transmission requests. If the determination is yes, then the relay node attempts to establish a connection with the requesting node at block 208.

At block 210, the relay node determines whether a connection with the requesting node has been established. If the determination is no, then the relay node disregards the transmission request at block 206 and returns to block 202 to await further transmission requests. If the determination is yes, then the relay node begins receiving data and/or commands from the requesting node at block 212. At block 214, the relay node determines the next node in the communication channel to which it is authorized to establish a connection, for example, by referring to the authorized connections list. At block 216, the relay node forwards the data and/or commands that were received (via block 212) to the next node in the channel.

In the foregoing embodiments, it should be appreciated that although the present disclosure specifically describes end nodes and relay nodes, those having ordinary skill in the art will readily understand that an end node may also provide relay node functionality in addition to any end node functionality, and vice versa. Thus, in the example of FIG. 1, additional hops may be added to extend the range of the network 100 by adding additional wireless instruments 104 as relay nodes 118. Indeed, embodiments of the present disclosure provide particular advantages when wireless instruments 104 are employed as relay nodes 118. Most wireless instruments like the wireless instruments 104 operate on battery and have a limited power supply. By maintaining a specific, predefined active routing path, embodiments of the present disclosure require significantly fewer relay nodes/wireless instruments to consume power compared to conventional solutions like mesh networks that simultaneously maintain multiple open, active routing paths. This allows battery-operated wireless instruments and other battery-operated devices in the network to run for longer periods in between battery replacements. The reduced power consumption would also reduce the amount of energy required to be harvested in devices that employ local energy harvesting.

Figure 3:
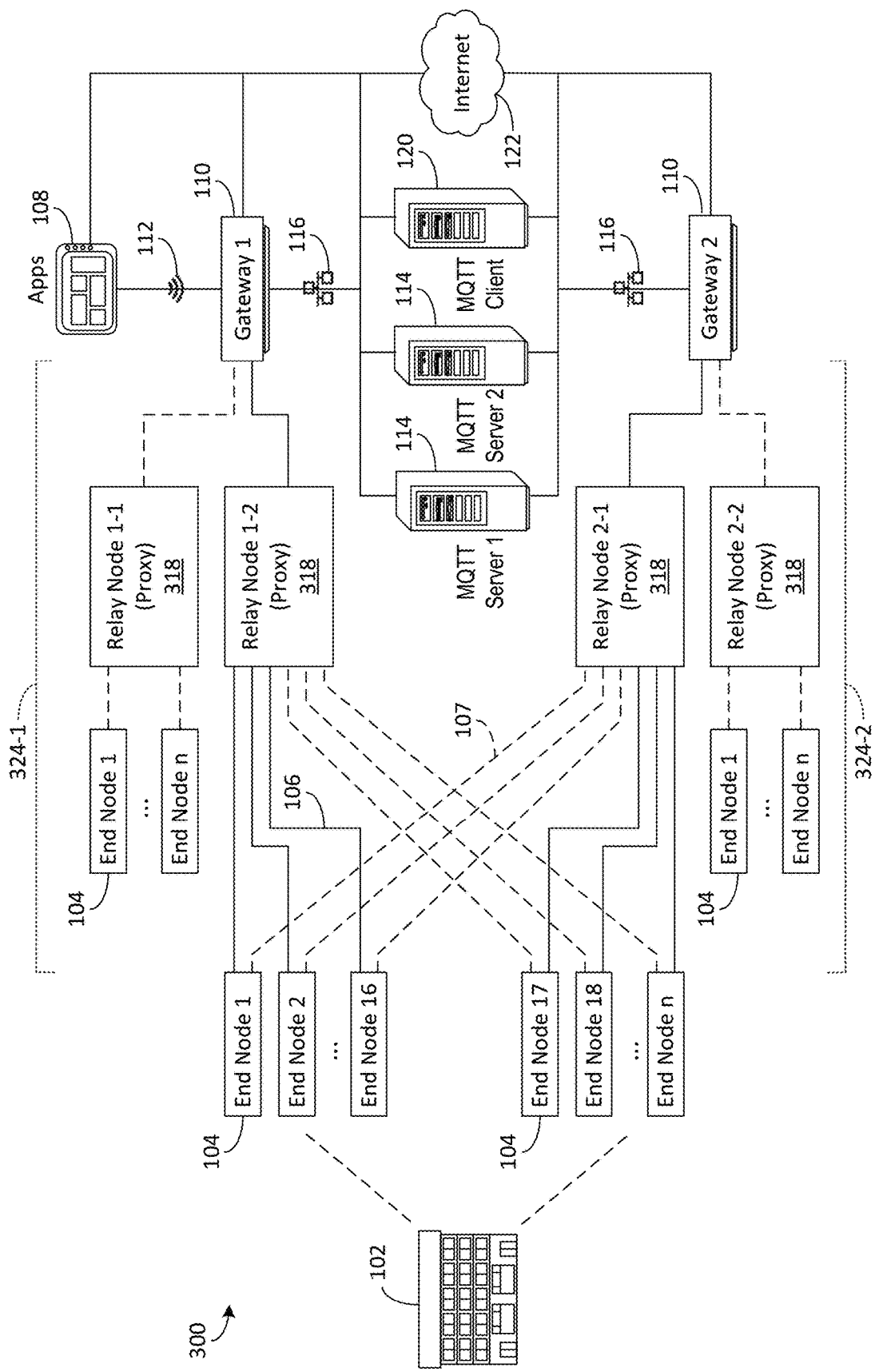
FIG. 3 is a schematic diagram illustrating an exemplary industrial wireless instruments network employing relay nodes to provide multiple parallel routing paths according to embodiments of the present disclosure.

Referring next to FIG. 3, another exemplary industrial wireless instruments network 300 is shown according to some embodiments of the present disclosure. The network 300 is similar to the network 100 from FIG. 1 except there are multiple gateways 110, designated as Gateway 1 and Gateway 2, connected as shown that are essentially identical to one another, as well as multiple database servers 114, designated as MQTT Server 1 and MQTT Server 2, connected as shown to handle the expected increase in data coming through the additional gateway 110.

In accordance with the disclosed embodiments, a plurality of relay nodes 318 may be deployed as part of the network 300 to provide parallel routing paths, indicated generally at 324-1 and 324-2, between the gateways 110 and the wireless instruments 104. Each relay node 318, like the relay nodes 118 from FIG. 1, is configured to be connected between two other relay nodes 318, or between a wireless instrument 104 and another relay node 318, or between a relay node 318 and one of the gateways 110. In addition, each relay node 318 operates as a proxy that is dedicated to the two nodes to which each relay node 318 is connected, as described with respect to FIG. 2.

In the FIG. 3 example, however, the relay nodes 118 are designated as Relay Node 1-1 & Relay Node 1-2 and Relay Node 2-1 & Relay Node 2-2. Relay Node 1-1 forms at least a portion of the routing path 324-1 connecting the wireless instruments 104 to Gateway 1, while Relay Node 1-2 provides at least a portion of a redundant or backup routing path (not expressly labeled) that also connects the wireless instruments 104 to Gateway 1. Similarly, Relay Node 2-2 forms at least a portion of the communication channel 324-2 connecting the wireless instruments 104 to Gateway 2, while Relay Node 2-1 provides at least a portion of a redundant or backup routing path (not expressly labeled) that also connects the wireless instruments 104 to Gateway 2. The addition of the parallel and redundant routing paths through Relay Node 2-1 and Relay Node 2-2 is commonly referred to as "scale out" where expansion is accomplished by adding more resources rather than by adding more functionality and/or operational capacity to existing resources.

In general operation, each of the wireless instruments 104 can connect to any one of the routing paths, as indicated by the dashed line connections 107, but only one routing path is active (i.e., available for routing) for a given wireless instrument 104, as indicated by the solid line connections 106. For each wireless instrument 104, one of the routing paths is assigned as the active routing path, while another one of the routing paths is assigned as a backup, and yet another one of the routing paths is assigned as a second backup, and so forth. Several wireless instruments 104 may have the same active routing path, as shown in FIG. 3, and also the same (or different) backup routing paths. Then, when an active routing path is not available, for example due to an outage or because too many requests are being handled (e.g., causing a relay node to time out), the wireless instrument 104 can switch to a backup, or a second backup, and so on. This not only helps ensure a high-reliability connection between the wireless instruments 104 and the gateways 110, but also automatically effects load-balancing amongst the various routing paths by automatically distributing high-volume network traffic amongst the routing paths.

Figure 4:
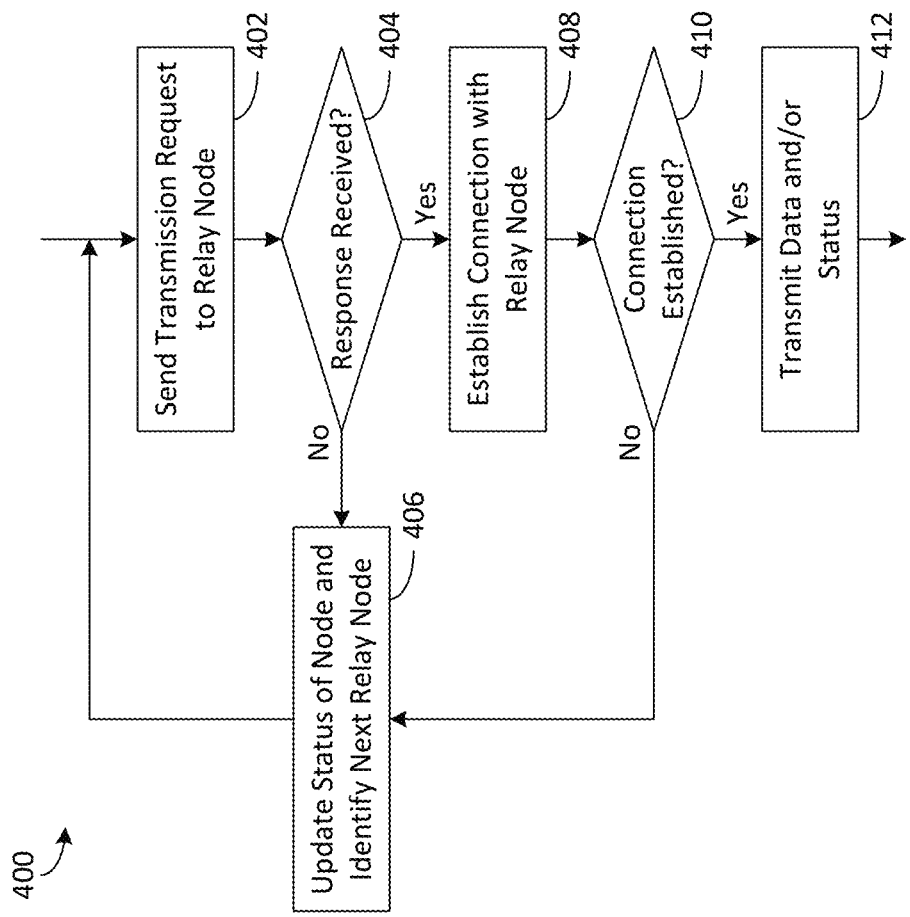
FIG. 4 is a flow diagram illustrating an exemplary method that may be used with a relay node from FIG. 3 according to embodiments of the present disclosure.

FIG. 4 shows a flow diagram 400 illustrating an exemplary method that may be used with the wireless instruments 104. The flow diagram 400 generally begins at block 402 when an industrial wireless instrument (e.g., End Node 1) sends a transmission request to a relay node (e.g., Relay Node 1-2). At block 404, the industrial wireless instrument determines whether a response has been received from the relay node within a specified amount of time. With BLE capable devices, for example, this time period or interval lasts approximately 6 ms, but longer or shorter time periods (i.e., fewer or more intervals) may certainly be used. If the determination is no, then at block 406 the industrial wireless instrument updates the status of the relay node as unavailable and identifies the next relay node (e.g., Relay Node 1-1) with which the wireless instrument is authorized to establish a connection, for example, by referring to an authorized connections list. If the determination is yes, then the industrial wireless instrument attempts to establish a connection with the relay node at block 408.

At block 410, the industrial wireless instrument determines whether a connection with the relay node has been established. If the determination is no, then the industrial wireless instrument identifies the next relay node with which the wireless instrument is authorized to establish a connection at block 406. If the determination is yes, then at block 412 the industrial wireless instrument begins transmitting data and/or status to the relay node with which a connection was established. Examples of data from the wireless instruments include any commonly-tracked industrial process data, such as temperature data, pressure data, humidity data, level data, and the like, as well as derivatives of such data, including skid efficiency, and process control data, such as controller setpoints, valve open/close points, and other controller outputs.

Figure 5:
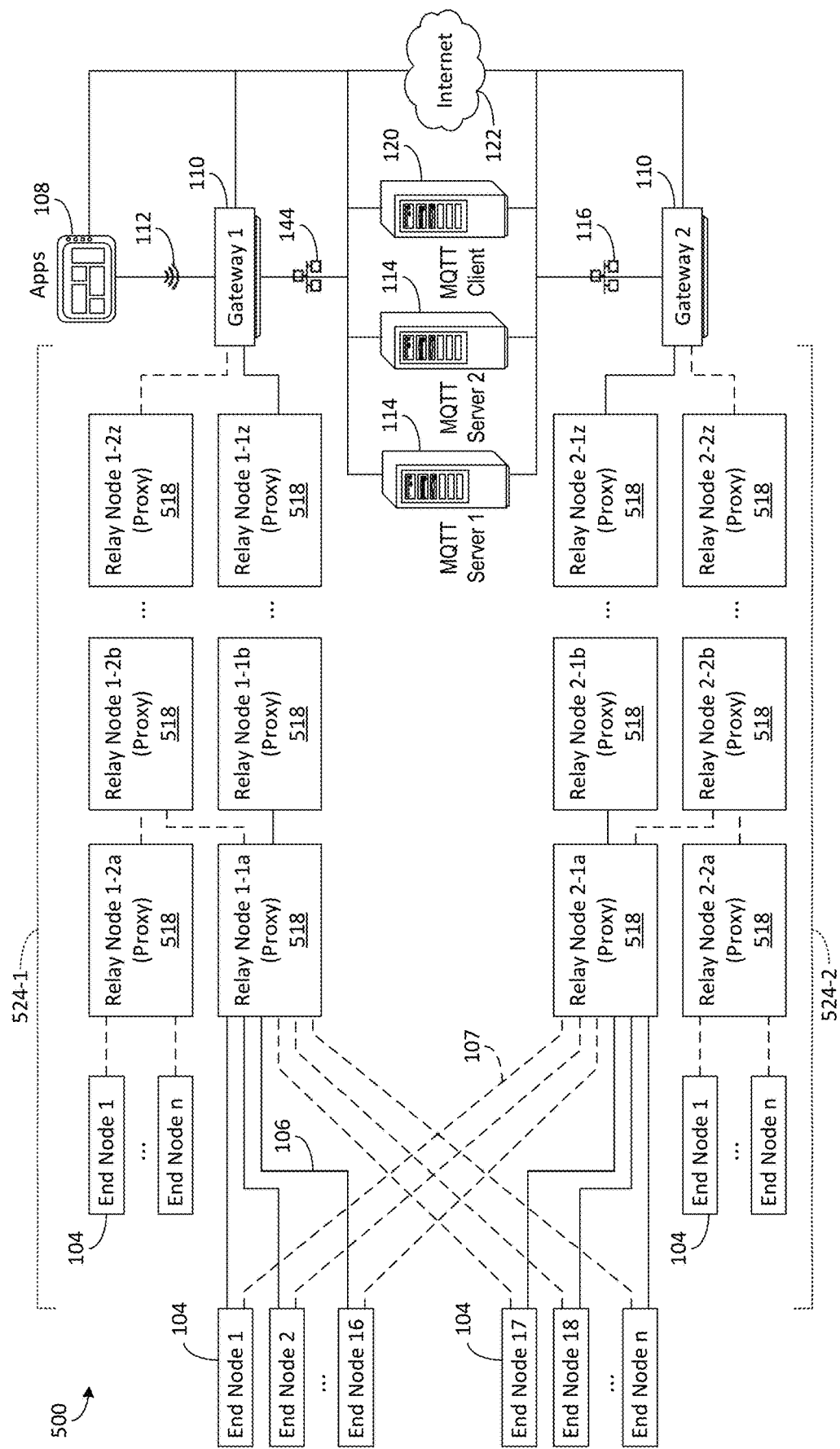
FIG. 5 is a schematic diagram illustrating an exemplary industrial wireless instruments network employing relay nodes in multiple parallel, multi-hop routing paths according to embodiments of the present disclosure.

Referring now to FIG. 5, yet another exemplary industrial wireless instruments network 500 is shown according to some embodiments of the present disclosure. The network 500 is similar to the network 300 from FIG. 3 insofar as there are multiple gateways 110 connected as shown that are essentially identical to one another, as well as multiple database servers 114 connected as shown to handle the expected increase in data coming through the additional gateway 110. In the example of FIG. 5, however, a plurality of relay nodes 518 may be deployed as part of the network 500 to provide not only parallel routing paths and redundant or backup routing paths in case of node outage or network congestion, but each routing path may also be a multi-hop routing path that extends an effective range of the wireless instruments 104 in the network 500.

As can be seen, the relay nodes 518 in FIG. 5 are designated as Relay Node 1-1a through Relay Node 1-1z, Relay Node 1-2a through Relay Node 1-2z, Relay Node 2-1a through Relay Node 2-1z, and Relay Node 2-2a through Relay Node 2-2z. The series of relay nodes 518 starting with Relay Node 1-1a forms at least a portion of the routing path 524-1 connecting the wireless instruments 104 to Gateway 1, while the series of relay nodes starting with Relay Node 1-2a provides at least a portion of a redundant or backup routing path (not expressly labeled) that also connects the wireless instruments 104 to Gateway 1. Similarly, the series of relay nodes 518 starting with Relay Node 2-2a forms at least a portion of the routing path 524-2 connecting the wireless instruments 104 to Gateway 2, while the series of relay nodes 118 starting with Relay Node 2-1a provides at least a portion of a redundant or backup routing path (not expressly labeled) that also connects the wireless instruments 104 to Gateway 2.

Operation of the wireless instruments 104 and the relay nodes 518 in the network 500 is similar to their counterparts in the network 300, as described with respect to FIGS. 3 and 4, except that each of the additional relay nodes 118 making up the routing paths adds greater distance to the range of the wireless instruments 104. Such an arrangement allows the network 500 to be easily scaled out as needed while also providing redundancy and automatic load balancing in the network. In addition, having a specific, predefined active routing path for a given wireless instrument 104 significantly reduces the computational load on the gateways 110 versus tracking multiple open, active routing paths. In a similar manner, keeping track of only two nodes significantly reduces the computational load on the relay nodes versus having to track potentially dozens of nodes.

In some embodiments, the various relay nodes discussed herein send and receive data using GATT (Generic Attribute Profiles) operations. GATT refers to a standard protocol implemented in BLE capable devices that specifies how small segments of data, called "attributes," are sent and received. With GATT, a device may form a local (i.e., direct) connection to another device as either a client (i.e., a main or central device) or a server (i.e., a peripheral device). One client device may connect directly to multiple server devices, but a server device may only connect directly to one client device. To extend this local client-server connection, the relay nodes employ a proxy protocol contained within GATT. The GATT proxy protocol allows each relay node to appear as a client to one node and a server to another node, allowing each relay node to effectively assume both roles at once.

Consider, for example, an industrial heat exchange unit being monitored using two different wireless temperature sensors, an input temperature sensor and an output temperature sensor. In accordance with the disclosed embodiments, one or more GATT relay (proxy) nodes may be added to the network to provide one or more wireless hops. Temperature data from the two wireless temperature sensors may then be passed through the GATT relay (proxy) nodes to increase the range of these temperature sensors. In addition, as the data passes from one GATT relay node to another, the GATT protocol combines the data from the two temperature sensors into a single GATT table for further routing, which allows the data to be transmitted more efficiently in terms of network power consumption and number of network hops.

Exemplary GATT tables are shown below in Tables 1-3. The creation, interpretation, and use of GATT tables are well known and therefore only a brief description of the tables is provided here. As well, those having ordinary skill in the art will understand that the particular fields shown in Tables 1-3 are provided for illustrative purposes, and additional and/or alternative fields may be included in the tables as needed for a particular application.

Table 1 below shows an exemplary GATT table that may be used for a wireless instrument, such as any of the wireless instruments 104 discussed herein. The GATT table in Table 1 generally complies with the requirements of the GATT protocol insofar as the table contains several items of required information. In particular, Handle is an index reference for a given item of information, UUID (Universally Unique Identifier) is a unique identifier for the item of information, UUID Type refers to the data type of the item of information, Value is the hexadecimal representation of the value (where applicable) of the item of information, and Description provides a brief description of the item of information. It can be seen from below that the GATT table in Table 1 is used for a wireless temperature sensor, such as one of the two wireless temperature sensors mentioned in the industrial heat exchange unit above.

TABLE 1

Instrument GATT Table

| Handle | UUID | UUID Type | Value | Description |
|---|---|---|---|---|
| 0x0001 | 0x2800 | GATT Primary Service Declaration | 0x1800 | Generic Access Service |
| 0x0002 | 0x2803 | GATT Characteristic Declaration | | Device Name |
| 0x0003 | 0x2A00 | Device Name | | End Node 1 |
| 0x0004 | 0x2800 | GATT Primary Service Declaration | 0x1801 | Generic Attribute Service |
| 0x0005 | 0x2800 | GATT Primary Service Declaration | 0x180A | Device Information Service |
| 0x0006 | 0x2803 | GATT Characteristic Declaration | | Serial Number Characteristic |
| 0x0007 | 0x2A25 | Serial Number String | | Serial Number Data 16 Characters |
| 0x0008 | 0x2800 | GATT Primary Service Declaration | | Temperature Service |
| 0x0009 | 0x2803 | GATT Characteristic Declaration | | Temperature Data Characteristic |
| 0x000A | 0xAA01 | Measurement Data | | Current Measurement Data 32-bit Floating |

Table 2 below shows an exemplary GATT table that may be used for a relay node, such as any of the relay nodes 118, 318, 518 discussed herein. Again, the table contains several items of information required by the GATT protocol, as described with respect to Table 1. Those having ordinary skill in the art will note the lack of any proxy information in this table. This is because no data is currently being routed through this relay node.

TABLE 2

Relay Node GATT Table (no nodes routed through)

| Handle | UUID | UUID Type | Value | Description |
|---|---|---|---|---|
| 0x0001 | 0x2800 | GATT Primary Service Declaration | 0x1800 | Generic Access Service |
| 0x0002 | 0x2803 | GATT Characteristic Declaration | | Device Name |
| 0x0003 | 0x2A00 | Device Name | | Relay Node 1-1 |
| 0x0004 | 0x2800 | GATT Primary Service Declaration | 0x1801 | Generic Attribute Service |
| 0x0005 | 0x2800 | GATT Primary Service Declaration | 0x180A | Device Information Service |
| 0x0006 | 0x2803 | GATT Characteristic Declaration | | Serial Number Characteristic |
| 0x0007 | 0x2A25 | Serial Number String | | Serial Number Data 16 Characters |

Table 3 below also shows an exemplary GATT table that may be used for a relay node, such as any of the relay nodes 118, 318, 518 discussed herein. However, this GATT table differs from the one in Table 2 in that the Table 3 GATT table reflects a relay node currently connected to and operating as a proxy for two wireless instruments, such as the two wireless temperature sensors mentioned above. More specifically, Table 3 includes a copy of the GATT tables from the two wireless temperature sensors being proxied. The two proxied GATT tables can be seen in Table 3 as Proxied 1 End Node 1 and so forth, and Proxied 2 End Node 2 and so forth. The Table 3 GATT table may then be routed through the next relay node in the routing path to send combined data for both temperature sensors, thereby making the transport of the data through the network more efficient.

TABLE 3

Relay Node GATT Table (two End Nodes routed through)

| Handle | UUID | UUID Type | Value | Description |
|---|---|---|---|---|
| 0x0001 | 0x2800 | GATT Primary Service Declaration | 0x1800 | Generic Access Service |
| 0x0002 | 0x2803 | GATT Characteristic Declaration | | Device Name |
| 0x0003 | 0x2A00 | Device Name | | Relay Node 1-2 |
| 0x0004 | 0x2800 | GATT Primary Service Declaration | 0x1801 | Generic Attribute Service |
| 0x0005 | 0x2800 | GATT Primary Service Declaration | 0x180A | Device Information Service |
| 0x0006 | 0x2803 | GATT Characteristic Declaration | | Serial Number Characteristic |
| 0x0007 | 0x2A25 | Serial Number String | | Serial Number data 16 characters |
| 0x0008 | 0x2800 | GATT Primary Service Declaration | 0x1800 | Proxied 1 Generic Access Service |
| 0x0009 | 0x2803 | GATT Characteristic Declaration | | Proxied 1 Device Name |
| 0x000A | 0x2A00 | Device Name | | Proxied 1 End Node 1 |
| 0x000B | 0x2800 | GATT Primary Service Declaration | 0x1801 | Proxied 1 Generic Attribute Service |
| 0x000C | 0x2800 | GATT Primary Service Declaration | 0x180A | Proxied 1 Device Information Service |
| 0x000D | 0x2803 | GATT Characteristic Declaration | | Proxied 1 Serial Number Characteristic |
| 0x000E | 0x2A25 | Serial Number String | | Proxied 1 Serial Number Data 16 Characters |
| 0x000F | 0x2800 | GATT Primary Service Declaration | | Proxied 1 Temperature Service |
| 0x0010 | 0x2803 | GATT Characteristic Declaration | | Proxied 1 Temperature Data Characteristic |
| 0x0011 | 0xAA01 | Measurement Data | | Proxied 1 Current Measurement Data 32-bit Floating |
| 0x0012 | 0x2800 | GATT Primary Service Declaration | 0x1800 | Proxied 2 Generic Access Service |
| 0x0013 | 0x2803 | GATT Characteristic Declaration | | Proxied 2 Device Name |
| 0x0014 | 0x2A00 | Device Name | | Proxied 2 End Node 2 |
| 0x0015 | 0x2800 | GATT Primary Service Declaration | 0x1801 | Proxied 2 Generic Attribute Service |
| 0x0016 | 0x2800 | GATT Primary Service Declaration | 0x180A | Proxied 2 Device Information Service |
| 0x0017 | 0x2803 | GATT Characteristic Declaration | | Proxied 2 Serial Number Characteristic |
| 0x0018 | 0x2A25 | Serial Number String | | Proxied 2 Serial Number Data 16 Characters |
| 0x0019 | 0x2800 | GATT Primary Service Declaration | | Proxied 2 Temperature Service |
| 0x001A | 0x2803 | GATT Characteristic Declaration | | Proxied 2 Temperature Data Characteristic |
| 0x001B | 0xAA01 | Measurement Data | | Proxied 2 Current Measurement Data 32-bit Floating |

Figure 6:
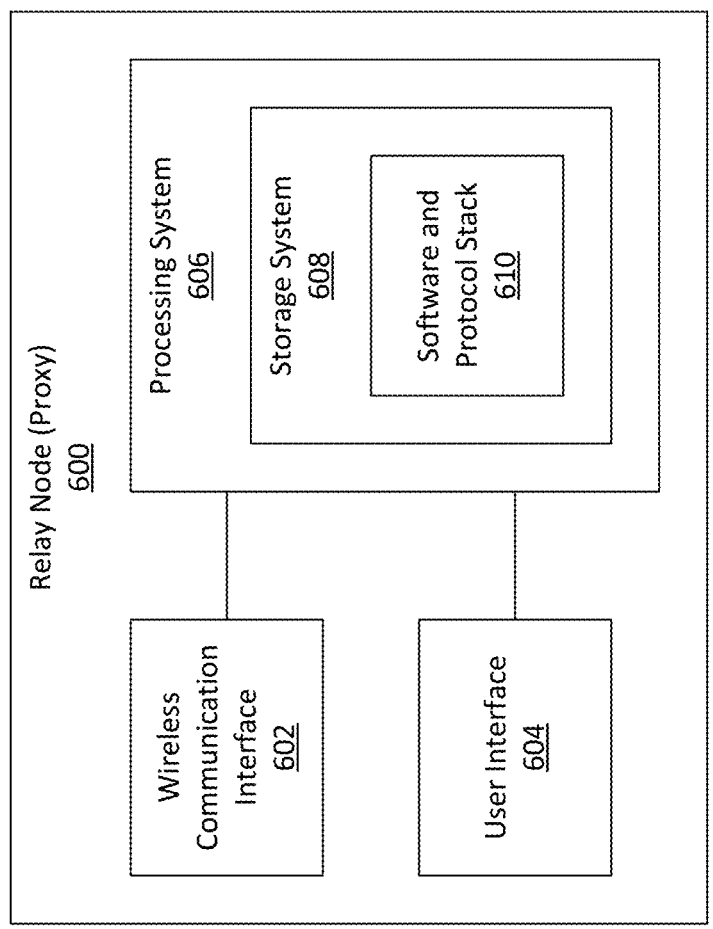
FIG. 6 is a block diagram illustrating an exemplary node that may be used with a relay node according to embodiments of the present disclosure.

FIG. 6 illustrates an exemplary processing node 600 that may be used to implement one or more aspects of an industrial wireless instruments network in accordance with exemplary embodiments of the present disclosure. The processing node 600 can include a wireless communication interface 602, user interface 604, and processing system 606 in communication with the wireless communication interface 602 and the user interface 604. The processing system 606 includes a storage system 608, which can comprise a disk drive, flash drive, memory circuitry, or other memory device. The storage system 608 can store a software 610 that is used in the operation of the processing node 600, such as program instructions and communication protocols, including the BLE protocol stack. The program instructions can also include computer programs, firmware, or some other form of machine-readable instructions, including an operating system, utilities, drivers, network interfaces, applications, or some other type of software. The processing system 606 can include a microprocessor and other circuitry to retrieve and execute software 610 from storage system 608. The processing node 600 can further include other components such as a power management unit, a control interface unit, and the like, which are omitted for clarity. The communication interface 602 permits the processing node 600 to communicate with other network elements and the user interface 604 permits configuration and control of the operation of the processing node 600. The processing node 600 can also be a component of a network, such as the components 104, 118, 318, and 518 of the networks 100, 300, and 500, respectively. The processing node 600 can also be another network element in another network.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A method of forming an industrial wireless instruments network, comprising:
   providing at least one routing path in the network using a low energy wireless multi-hop mesh protocol, each of the at least one routing path being a specific, predefined connection-oriented routing path in the network;
   connecting one of at least one industrial wireless instrument to one of at least one network gateway using the at least one routing path; and
   relaying data from the one of at least one industrial wireless instrument to the one of at least one network gateway through at least one relay node in the at least one routing path, the at least one relay node relaying the data between a specific, predefined sending node and a specific, predefined receiving node in the at least one routing path using a proxy protocol, the specific predefined sending node being an immediately preceding node to the at least one relay node and the specific predefined receiving node being an immediately next node to the at least one relay node in the at least one routing path;
   wherein the at least one relay node, the specific, predefined sending node, and the specific, predefined receiving node form an active routing path from among the at least one routing path, only said active routing path being available for relaying data by the one of at least one industrial wireless instrument such that data is relayed between the one of at least one industrial wireless instrument and the one of at least one network gateway only along said active routing path until the active routing path becomes unavailable; and
   wherein the at least one relay node operates as a dedicated intermediary between the specific predefined sending node and the specific predefined receiving node for the at least one relay node.

2. The method of claim 1, wherein the sending node is one of an industrial wireless instrument or a specific, predefined relay node, and the receiving node is one of a specific, predefined relay node or a network gateway.

3. The method of claim 1, wherein the at least one routing path includes a multi-hop routing path connecting the one of at least one industrial wireless instrument to the one of at least one network gateway, the multi-hop routing path including a plurality of relay nodes, each relay node constituting one hop in the multi-hop routing path.

4. The method of claim 1, wherein the at least one routing path includes a parallel routing path connecting the one of at least one industrial wireless instrument to the one of at least one network gateway, and each of the at least one relay node in the parallel routing path is a parallel relay node.

5. The method of claim 1, wherein the at least one routing path includes a redundant routing path connecting the one of at least one industrial wireless instrument to the one of at least one network gateway, and each of the at least one relay node in the redundant routing path is a redundant relay node.

6. The method of claim 1, wherein the at least one routing path includes a redundant, parallel, multi-hop routing path connecting the one of at least one industrial wireless instrument to the one of at least one network gateway, and each of the at least one relay node in the redundant, parallel, multi-hop routing path is a redundant, parallel relay node.

7. The method of claim 1, wherein the at least one relay node includes industrial wireless instrument functionality.

8. An industrial wireless instruments network, comprising:
    at least one industrial wireless instrument; and
    at least one relay node operable to provide at least a portion of a routing path between the at least one industrial wireless instrument and a network gateway, the at least one relay node operable to relay data between a specific, predefined sending node and a specific, predefined receiving node in the routing path using a proxy protocol, the specific predefined sending node being an immediately preceding node to the at least one relay node and the specific predefined receiving node being an immediately next node to the at least one relay node in the at least one routing path;
    wherein the routing path is a specific, predefined connection-oriented routing path that uses a low energy wireless multi-hop mesh protocol and data is relayed between the at least one industrial wireless instrument and the network gateway only along the routing path until the routing path becomes unavailable; and
    wherein the at least one relay node operates as a dedicated intermediary between the specific predefined sending node and the specific predefined receiving node for the at least one relay node.

9. The network of claim 8, wherein the sending node is one of an industrial wireless instrument or a specific, predefined relay node, and the receiving node is one of a specific, predefined relay node or the network gateway.

10. The network of claim 8, wherein the routing path is a multi-hop routing path connecting the at least one industrial wireless instrument to the network gateway, the multi-hop routing path including a plurality of relay nodes, each relay node constituting one hop in the multi-hop routing path.

11. The network of claim 8, wherein the routing path is a parallel routing path connecting the at least one industrial wireless instrument to the network gateway, and each of the at least one relay node in the parallel routing path is a parallel relay node.

12. The network of claim 8, wherein the routing path is a redundant routing path connecting the at least one industrial wireless instrument to the network gateway, and each of the at least one relay node in the redundant routing path is a redundant relay node.

13. The network of claim 8, wherein the at least one routing path includes a redundant, parallel, multi-hop routing path connecting the at least one industrial wireless instrument to the network gateway, and each of the at least one relay node in the redundant, parallel, multi-hop routing path is redundant, parallel relay node.

14. The network of claim 8, wherein the at least one relay node includes industrial wireless instrument functionality.

15. A relay node for an industrial wireless instruments network, comprising:
    a wireless communication interface;
    a processing system in communication with the wireless communication interface; and
    a storage system connected to the processing system, the storage system including program instructions that, when executed by the processing system, cause the relay node to perform operations comprising:
    providing a portion of at least one routing path in the network using a low energy wireless multi-hop mesh protocol, each of the at least one routing path being a specific, predefined connection-oriented routing path in the network;
    connecting at least one industrial wireless instrument to a network gateway using the portion of the at least one routing path; and
    relaying data from the at least one industrial wireless instrument to the network gateway, the relay node relaying the data between a specific, predefined sending node and a specific, predefined receiving node in the portion of the at least one routing path using a proxy protocol, the specific predefined sending node being an immediately preceding node to the at least one relay node and the specific predefined receiving node being an immediately next node to the at least one relay node in the at least one routing path;
    wherein the relay node, the specific, predefined sending node, and the specific, predefined receiving node form an active routing path from among the at least one routing path, only said active routing path being available for relaying data by the one of at least one industrial wireless instrument such that data is relayed between the one of at least one industrial wireless instrument and the network gateway only along said active routing path until the active routing path becomes unavailable; and
    wherein the at least one relay node operates as a dedicated intermediary between the specific predefined sending node and the specific predefined receiving node for the at least one relay node.

16. The relay node of claim 15, wherein the sending node is one of an industrial wireless instrument or a specific, predefined relay node, and the receiving node is one of a specific, predefined relay node or the network gateway.

17. The relay node of claim 15, wherein the routing path is a multi-hop routing path connecting the at least one industrial wireless instrument to the network gateway, the multi-hop routing path including a plurality of relay nodes, each relay node constituting one hop in the multi-hop routing path.

18. The relay node of claim 15, wherein the routing path is a parallel routing path connecting the at least one industrial wireless instrument to the network gateway, and the relay node is a parallel relay node in the parallel routing path.

19. The relay node of claim 15, wherein the routing path is a redundant routing path connecting the at least one industrial wireless instrument to the network gateway, and the relay node is a redundant relay node in the redundant routing path.

20. The relay node of claim 15, wherein the at least one routing path includes a redundant, parallel, multi-hop routing path connecting the at least one industrial wireless instrument to the network gateway, and the relay node is redundant, parallel relay node in the redundant, parallel, multi-hop routing path.

21. The relay node of claim 15, wherein the relay node includes industrial wireless instrument functionality.

* * * * *